Aug. 26, 1924.
H. MENSFORTH ET AL
1,506,543
TESTING DEVICE FOR MEASURING THE TEETH OF HELICALLY TOOTHED ELEMENTS
Filed May 20, 1921   2 Sheets-Sheet 1
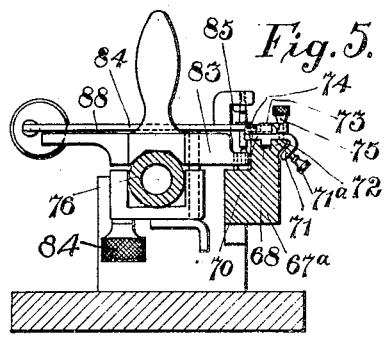
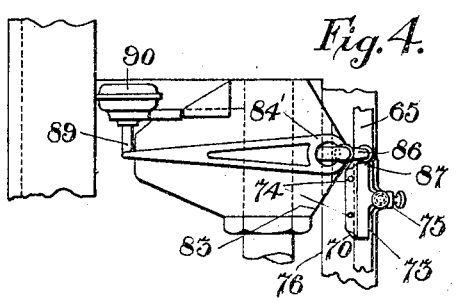
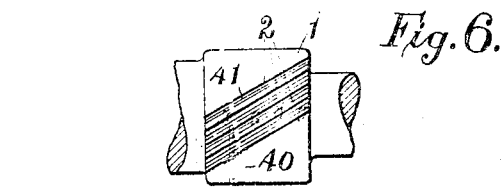
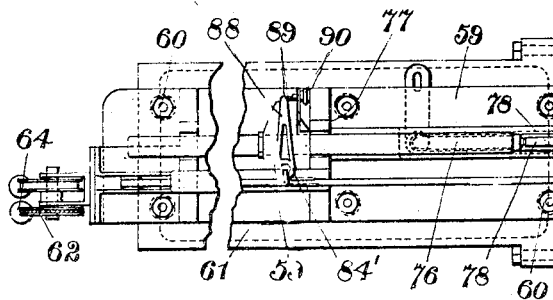
INVENTORS
Holberry Mensforth and
Frederick Arthur Cowell
BY
D. C. Davis
ATTORNEY Aug. 26, 1924. 1,506,543
H. MENSFORTH ET AL
TESTING DEVICE FOR MEASURING THE TEETH OF HELICALLY TOOTHED ELEMENTS
Filed May 20, 1921  2 Sheets-Sheet 2
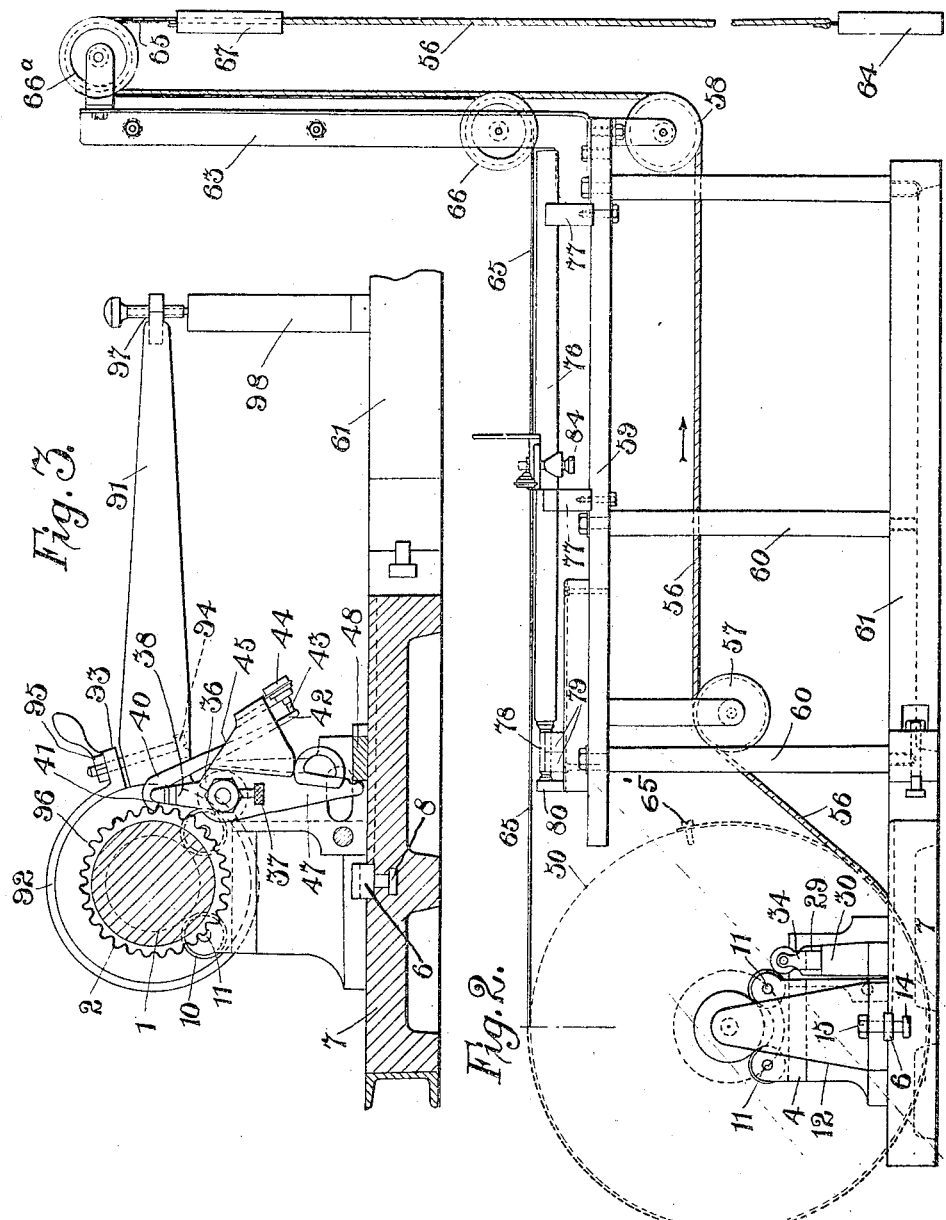
Holberry Mensforth and
Frederick Arthur Cowell
INVENTORS
BY D. C. Davis
ATTORNEY Patented Aug. 26, 1924.

1,506,543

UNITED STATES PATENT OFFICE.

HOLBERRY MENSFORTH, OF BOWDON, AND FREDERICK ARTHUR COWELL, OF SALE, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

TESTING DEVICE FOR MEASURING THE TEETH OF HELICALLY-TOOTHED ELEMENTS.

Application filed May 20, 1921. Serial No. 471,291.

*To all whom it may concern:*

Be it known that we, HOLBERRY MENSFORTH, a subject of the King of Great Britain, and a resident of Bowdon, in the county of Chester, England, and FREDERICK ARTHUR COWELL, a subject of the King of Great Britain, and a resident of Sale, in the county of Chester, England, have invented a new and useful Improved Testing Device for Measuring the Teeth of Helically-Toothed Elements, of which the following is a specification.

This invention has for its object to provide an improved device for examining or measuring the accuracy of the teeth of a helical pinion or gear wheel or of a hob such as is employed for cutting teeth in a gear cutting machine or other machine element of a similar kind.

In prior United States application, Serial No. 443,955 filed Feb. 10, 1921 there is described a device for examining and measuring the accuracy of the teeth of a pinion or hub wherein an indicating pointer adapted to make contact with selected points of the teeth is located in predetermined positions parallel with the axis of the pinion or hob by means of a number of distance gauges of different lengths, a relatively fixed stop being provided against which the teeth of the pinion or hob are adapted to be brought for the purpose of obtaining a predetermined angular rotation of the hob or pinion between two measurements or sets of measurements.

The use of a fixed stop for obtaining the angular rotation of the pinion or hob, however, only enables accurate measurements to be obtained if the faces of the teeth are themselves accurate.

The object of the present invention is to provide an improved device of the kind set forth in said prior application for examining or measuring the accuracy of the teeth of a pinion or hob, by means of which the pinion or hob is accurately rotated through an angle equal to or a multiple of the true circular pitch angle. The improved device is specially applicable for measuring pinions or hobs having helical teeth, that is to say teeth of relatively great longitudinal pitch.

The improved device comprises means for taking measurements of the teeth along lines parallel with the axis of the pinion or other element to be examined and means for rotating the element which is being examined through determined angles so that in combination with the first mentioned means circumferential distances between the teeth of the element may also be measured.

The measurements taken in lines parallel with the axis of the pinion or element are hereinafter termed "longitudinal pitch measurements", and the circumferential distances between the teeth or measurements made in planes perpendicular to the axis of the element "circular pitch measurements."

In one form of the improved device these measurements are rapidly and accurately made by the use of two sets of gauges, respectively termed "longitudinal pitch gauges" and "circular pitch gauges."

The longitudinal pitch gauges are employed to determine the various positions which the measuring instrument or pointer of the device must occupy in taking a set of readings in a plane parallel with the axis of the pinion or hob. The circular pitch gauges are employed to determine the amount of angular or rotary motion imparted to the pinion or hob between such readings.

In order that the nature of the invention may be clearly understood one form of the improved measuring device constructed in accordance therewith and adapted to examine the accuracy of the teeth of a helical pinion or gear wheel will now be described with reference to the accompanying drawings in which:—

Fig. 1 is a plan view of the device partly in section; Fig. 2 is an end elevation (some parts being omitted) of the device shown in Fig. 1, as seen from the left; Fig. 3 is a section on the line III—III of Fig. 1 as seen from the left and showing certain elements of the device; Fig. 4 is a plan of a detail on a larger scale, and Fig. 5 is an elevation partly in section also on a larger scale of the detail shown in Fig. 4; Fig. 6 is a diagrammatic view showing the pointer or feeler of the measuring instrument in contact with a tooth of the helical pinion.

Referring to the drawings and more especially to Figures 1 and 2, the pinion or gear wheel 1 having helical teeth 2, 2 and shaft portions 3, 3 at its ends is rotatably carried in two supports 4, 5 mounted to slide longitudinally in a longitudinal guideway 6 accurately machined in the main portion 7 of the bed plate of the apparatus. The distance apart of the supports 4 and 5 is adjusted so as to accommodate the pinion, the teeth of which are to be tested. Screws 8 and nuts (not shown) are provided for securely clamping the said supports to the bed plate 7 when they have been adjusted to the required position. The heads of the supports 4 and 5 are provided with roller bearings 10, 10 which are held in place by means of pins 11, 11. These roller bearings support the pinion 1 with a minimum of friction and are accurately made in order that the said pinion may be accurately rotated in the apparatus.

The pinion 1 is held against endwise movement by means of brackets 12, 13 arranged at the ends of the pinion and slidably mounted on the bed plate 7. The said brackets engage the guideway 6 and are provided with screws 14 and nuts 15 for clamping them in the position in which they are adjusted. In order to minimize the friction of the pinion 1, and preserve the longitudinal position of the pinion during rotation a steel ball 16 is interposed between recessed bosses 17 and 18 on the said brackets 12 and 13 and the ends of the shaft portions 3 of the pinion respectively. The boss 18 on the lower bracket 13 in Fig. 1 is in the form of a screw fitting into a screw-threaded recess 19 in the said bracket, the arrangement being such that by turning the boss the balls 16 may be forced axially against the ends of the pinion. Any suitable retaining means may be employed to hold the balls 16 in position, or the studs 17 and 18 may have concavities in their ends for this purpose. A lock nut 20 is preferably provided for securing the boss 18 in its adjusted position.

Additional supports 22 and 23 having V-shaped notches in their upper ends are also mounted on the bed plate 7 and engage transverse grooves or key-ways 24 therein. The said supports 22, 23 carry a shaft or arbor 25 and the position of these supports is so adjusted that the arbor 25 occupies a position parallel with the axis of the pinion 1 and separated therefrom by a distance depending on the diameter of the pinion to be tested. The arbor 25 is preferably more than twice the length of the total toothed portions of the pinion or gear wheel 1 in order that, as will be hereinafter described, the whole length of the pinion may be tested without the necessity for moving the latter axially on the bed plate.

The longitudinal positions of the arbor 25 are determined by means of the longitudinal pitch gauges 26 substantially in the manner set forth in the specification of the aforesaid prior application and as more particularly hereinafter set forth.

In Fig. 1 of the drawings one of the said gauges 26 is shown in position. It is supported on two V-blocks 27 adapted to slide in a groove 28 in the upper surface of a bar 29 supported on standards 30 on a base 31 adjustably attached to the bed-plate 7 by means, for example, of nuts and bolts (not shown) engaging transverse keyways 32. The height of the V-blocks 27 above the base-plate and the transverse adjustment of the base 31 are such that when a longitudinal pitch gauge 26 is accommodated in the said blocks it is in axial alignment with the arbor 25. The gauge 26, when in position, is adapted to abut at its upper end against a hardened nose 33 on a fixed abutment 34 carried by the bar 29. The arbor is adapted to be brought into engagement with the lower end, as illustrated in Fig. 1, of the gauge 26 the other end of which is in engagement with the nose 33 of the abutment 34. As already stated, the gauges 26 are of different lengths corresponding to the longitudinal pitch of the teeth of the pinion 1.

Mounted on the arbor 25 is a saddle 36 which is adapted to be clamped on the said arbor by means of a thumb screw 37 (see Fig. 3). The saddle 36 comprises an upwardly extending portion 38 having a bifurcated end in which is pivoted on a horizontal axis a two-armed multiplying lever 40 adapted to move in a vertical plane at right angles to the axis of the pinion 1. The smaller arm 41 of the lever 40 is in the form of a substantially spherical nose or "pointer" adapted to make point contact with the faces of the teeth of the pinion, such point contact being preferably, although not necessarily, at the pitch circle diameter of the pinion. The long arm 42 of the lever 40 engages a pin or plunger 43 which slides into a dial micrometer or other micrometer indicating device 44 carried on a lateral extension 45 of the saddle 36. The saddle 36 is also provided with a downwardly extending arm 47 adapted to make contact with a fixed stop constituted by a bar 48 extending along the bed-plate and attached by means of distance pieces 49 to the arbor supports 22 and 23. This arrangement of the bar 48 and arm 47 enables the pointer 41 in any longitudinal position occupied by the arbor 25 to occupy a position always a constant distance from, and in the same horizontal plane as, the axis of the pinion.

The means for obtaining rotation of the pinion through a predetermined angle will now be described. Upon one end of the pinion 1 is secured a wheel or drum 50 which is bolted to a hub 51 (see Fig. 1) adapted to be forced onto a tapered sleeve 52. The sleeve 52 is preferably of the well-known adapter type, that is, it is contractile and expansible. This construction permits the sleeve 52 to be forced on to the shaft portion 3 of the pinion 1. The hub 51 carrying the wheel or drum 50 is then forced on the tapered portion of the sleeve 52 and secured by means of a nut 53. In this manner the wheel or drum 50 is accurately and securely fastened to the pinion.

The periphery of the wheel or drum 50 is formed with a groove 54 and also with an accurately machined cylindrical surface 55. A cord 56 is attached to the wheel 50 and passing in the groove 54, leaves the wheel from below as shewn in Fig. 2 and passes over a pulley 57 and under a pulley 58 carried beneath a horizontal table 59 which is supported by standards or uprights 60 on a bed-plate 61 attached to the main bed plate 7 and disposed at right angles to the latter, as clearly shewn in Figs. 1 and 2. The cord 56 then passes over a third pulley 62 on a vertical bracket 63 attached to the end of the table 59 and a weight 64 is attached to the end of the cord to maintain the latter in tension for a purpose which will shortly be explained.

One end of a flexible steel tape 65 is attached to the cylindrical surface 55 of the wheel or drum 50 by any suitable clamping means, as by the screw 65' in Fig. 2, and is adapted to be wrapped round the said surface. The tape extends horizontally from the top of the wheel or drum 50 over the horizontal table 59 and passes beneath a pulley 66 carried by the bracket 63 and thence upwards and over a pulley 66ª at the upper end of said bracket and is provided with a weight 67. The weight 64 on the cord 56 and the weight 67 on the steel tape 65 maintain the wheel or drum 50 in equilibrium since the tensions of the cord and tape tend to rotate the drum 50 in opposite directions.

Mounted above the table 59 is a transverse member 67ª having in its upper surface an accurately machined groove 68 in which is adapted to slide a shoe 70. The shoe 70 is provided with a hook-shaped portion 71 embracing a lip 72 formed on the side of the slide 67ª, a thumb screw 71ª being provided in the hook-shaped portion 71 for the purpose of clamping the shoe 70 to the grooved member 67ª. Upon the upper face of the shoe 70 is attached a plate 73 by means of screws 74 at the left-hand side (see Figs. 4 and 5). The plate 73 is provided at the right-hand side with a thumb screw 75 having screw-threaded engagement with the shoe 70. The steel tape 65 passes between the plate 73 and the shoe 70 and is adapted to be clamped to the latter by means of the thumb screw 75, the upper surface of the shoe 70 being in the same horizontal tangential plane as the top of the wheel or drum 50 and the bottom of the pulley 66.

For rotating the pinion 1 through predetermined definite angles corresponding with the circular pitch which the teeth should really possess the tape 65 is unwound from the periphery of the wheel or drum 50 by an amount which is accurately determined as follows.

A second arbor 76 is mounted in V-blocks 77 permanently attached to the horizontal table 59 and the longitudinal positions of the arbor 76 are determined by means of the circular pitch gauges 78 in a manner similar to that described in connection with the means for determining the longitudinal positions of the arbor 25. One of said gauges 78 is indicated in position in Figs. 1 and 2. It is supported in V-blocks 79 and at one end engages a fixed abutment 80, attached to block 81 fixed on the table 59. The V-blocks 79 slide in a groove in the top surface of the block 81.

Upon the arbor 76 is mounted a saddle 83 (see Figs. 4 and 5) which is provided with a clamping screw 84 to enable the saddle to be fixed to the arbor 76 in a suitable position. A two-armed lever 84' is pivoted on a vertical axis 85 on the saddle 83, the said lever having a short arm 86 formed with a substantially spherical end adapted to make point contact with the end 87 of the shoe 70. The long arm 88 of the lever 84' engages a pin or plunger 89 sliding into a dial micrometer or other micrometer indicating device 90 supported on the saddle 83.

The angular adjustment of the pinion 1 is obtained by the following means. A lever 91 having a hub 92 which is split at 93 and provided with a screw 94 and a clamping nut 95 is arranged upon the conical hub 51 which carries the wheel or drum 50 (see Figs. 1 and 3), although, if desired, the hub 92 may be clamped on the shaft portion 3 of the pinion. A lock-nut 96 is provided on the split sleeve 52 to retain the hub 92 in position. The lever 91 extends horizontally as shown and is provided at its free end with a fine thread screw 97 designed to engage the upper surface of a pillar 98 secured to the bed plate 61. The nut 95 having been tightened up firmly to secure the lever 91 with relation to the pinion, the screw 97 may be used to obtain a fine angular adjustment of the pinion.

The manner in which the device may be employed for examining the accuracy of the teeth 2 of the pinion 1 will now be described. Assuming that the pinion has been properly mounted in the supports 4 and 5 and all endwise movement precluded by adjustment of the screw boss 18 in the bracket 13 and the arbor 25 properly located with respect to the pinion, the longitudinal position of the arbor 25 carrying the measuring pointer 41 is fixed by means of one of the longitudinal pitch gauges 26 preferably the shortest of such gauges. The angular position of the pinion is then adjusted by means of the lever 91 and the fine adjustment screw 97 until the dial micrometer 44 carried by the saddle 38 indicates zero, the pointer 41 of the lever 40 being then in contact with a tooth on the pitch circle diameter, for example, whilst the depending arm 47 of the saddle 38 is in engagement with the block 48.

The position of the locating shoe 70 on the steel tape 65 is then adjusted, that is to say, by temporarily unclamping the locating shoe 70, and moving it towards the wheel 50, so that with one of the circular pitch gauges determining the position of the arbor 76 adjacent thereto, the dial micrometer 90, when the small arm 86 on the lever 84 is in contact with the end 87 on the said locating shoe, will give a zero indication. The screw 75 is then manipulated to clamp the locating shoe 70 to the tape.

A series of longitudinal pitch readings may then be taken by consecutively inserting the various longitudinal pitch gauges 26, the errors or inaccuracies, if any, of the teeth being indicated upon the dial micrometer 44 and these indications noted. To permit the insertion and removal of these gauges the arbor 25 carrying the instrument saddle 38 is rotated in its supports 22, 23 in order to bring the pointer 41 of the lever 40 out of engagement with the teeth 2 of the pinion and is also moved endwise to enable the gauges 26 to be removed or exchanged. The said arbor 25 after each change of longitudinal pitch gauge is moved into engagement with the latter and rotated again until the depending arm 47 engages the block 48. The pointer 41 engages the faces of the teeth consecutively as shewn diagrammatically in Fig. 6. During these measurements the pinion is angularly fixed in the position to which it has been previously adjusted by means of the lever 91 and screw 97.

In order to take another set of longitudinal pitch readings in another axial line on the teeth of the pinion the latter is rotated by unclamping the adjusting arm 91 and raising the latter and again clamping it on the pinion. The adjusting arm 91 is then moved downwards to rotate the pinion. This rotation of the pinion will cause the locating shoe 70 attached to the steel tape 65 to slide in the groove 68. The appropriate circular pitch gauge 78 is then inserted in position on the V-blocks 79 in order to determine the position of the arbor 76 carrying the indicating micrometer 90. The angular position of the pinion is then adjusted by manipulating the screw 97 at the end of the adjusting lever 91 until the said micrometer 90 again indicates zero. The pinion will then have been rotated through an amount determined by the particular gauge used which will usually be the next gauge in succession corresponding to an angular rotation equal to the circumferential pitch in a plane perpendicular to the axis between the corresponding faces of one tooth and the next of the pinion.

Another set of longitudinal pitch readings may then be obtained in the manner above described. These operations may be repeated until readings have been taken for such of the teeth of the pinion or gear as may be desired.

To reduce the number of circular pitch gauges 78 which it would ordinarily be necessary to provide to enable readings to be taken over the whole circumference of the pinion or gear, the locating shoe 70 clamped to the steel tape 65 may be moved periodically relatively to the tape after a number of readings have been taken. The accurate readjustment of the position of the shoe with respect to the tape may be determined by means of the micrometer 90 operated by the two-armed lever 84 the short arm 86 of which engages the said shoe.

It will be observed that the device only indicates relative errors of the teeth, it being impossible to provide with accuracy a datum or starting point with which all parts of the teeth of the pinion touched by the lever arm 41 can be compared. The series of measurements can be commenced at any point on any tooth of the pinion and a comparison of the other teeth made with such setting-up or starting point. If the latter is itself inaccurate the fact will become apparent during the subsequent readings which will mostly indicate a nearly constant amount of inaccuracy thus shewing that the point on the tooth where the first or setting-up adjustment was made was itself inaccurate. If this is the case recommencement of the investigations may be avoided by computing the relative error from the written record of the readings taken.

It is to be understood that the device described above represents only one form in which a measuring device may be constructed in accordance with this invention and that the device may assume various forms without departing from the spirit and scope of the invention.

For example, any suitable means may be employed other than those described which will ensure accurate angular rotation of the pinion or gear corresponding to its tooth pitch.

What we claim is:—

1. A device for testing the accuracy of helically-toothed elements comprising indicating mechanism for determining the accuracy of teeth in axial planes, means for moving the indicating mechanism predetermined distances along lines parallel to an element axis, and means for turning the element through predetermined angular distances.

2. A device for testing the accuracy of helically-toothed elements comprising a support for a helically-toothed element, a member movable parallel to the element axis, a tooth contactor or feeler movable with respect to said member, an indicator connected to the contactor or feeler, means for setting the member in a predetermined position, and means for adjusting the toothed element angularly until the indicator gives a desired reading.

3. A device for testing the accuracy of helically-toothed elements comprising a support for a helically-toothed element, a support movable in a path parallel to the axis of the toothed element, a feeler carried by the support, an indicator associated with the feeler, means for locating the movable support in a predetermined position in its path, means for turning the helically-toothed element until the indicator gives a desired reading, an angular indicating device for the toothed element, means for setting the latter for a desired reading after the first indicator is set, means to thereafter secure movement of the toothed member through definite angular distances, and means to secure predetermined longitudinal adjustments of the feeler support for each angular adjustment of the helically-toothed element.

4. A device for testing the accuracy of helically-toothed elements comprising a support for a helically-toothed element, a tooth feeler mechanism movable in a path parallel to the element axis, an abutment, a plurality of distance pieces of predetermined lengths for interposition between the abutment and the feeler mechanism, means for turning and setting the toothed member in a desired position, and gauge mechanism to secure turning of the toothed member through predetermined angular distances.

5. A device for testing the accuracy of helically-toothed elements comprising a support for a helically-toothed element, gauge mechanism for testing teeth in axial planes at a plurality of predetermined positions, second gauge mechanism to secure adjustment of the toothed member to different predetermined angular positions, and means for turning the helically-toothed element to secure an initial or starting setting of the gauge mechanisms.

6. A device for testing the accuracy of helically-toothed elements comprising a support for a helically-toothed element, means for taking measurements of the teeth at predetermined distances along lines parallel to the element axis when the element is in a determinable position, and means for rotating the toothed element through predetermined angular distances to secure a plurality of determinable positions at which measurements are made.

7. A device for testing the accuracy of helically-toothed elements comprising a feeler movable parallel to the toothed element axis, a series of gauge elements for cooperation with the feeler and which differ in length by increments of the desired longitudinal pitch for the toothed element, means for turning the toothed element to secure gauging positions thereof, and gauge elements associated with the toothed element which differ by increments which are proportional to the circular pitch, or a multiple thereof, of the toothed element.

8. In a device for testing the accuracy of helically-toothed elements comprising means which is movable in a path parallel to the axis of a helically-toothed element, a plurality by distance pieces cooperating with said means and which differ by increments of length corresponding to the longitudinal pitch of the toothed element, means for turning the toothed element, and means to assure the turning of the toothed element through predetermined angular distances including distance pieces which differ by increments of length, proportional to the circular pitch, or a multiple thereof, of the toothed element.

9. A device for testing the accuracy of helically-toothed elements comprising a support for a helically-toothed element, distance gauge mechanism for measuring the teeth of the element in axial planes thereof, means for turning the toothed element, and distance gauge mechanism cooperating with the toothed element to assure turning thereof to predetermined angular positions.

10. In a device for testing the accuracy of helically-toothed elements comprising a support for a helically-toothed element, a distance gauge arranged parallel to the axis of the helically-toothed element, a second distance gauge arranged transversely of the helically-toothed element, and means for connecting the second distance gauge mechanism to the toothed element so that the latter may be turned through predetermined angular distances.

11. In a device for testing the accuracy of helically-toothed elements comprising a support for a helically-toothed element, distance-gauge mechanism for measuring teeth in axial planes and including a plurality of distance or gauge pieces of predetermined and different lengths, a second gauge mechanism including a plurality of gauge or distance pieces of predetermined and different lengths, and means for connecting the second gauge mechanism to the helically-toothed element to provide for turning thereof to predetermined angular positions.

12. A device for testing the accuracy of helically-toothed members comprising a support for a helically-toothed element, testing mechanism which is movable in a path parallel to the toothed element axis, means for turning the toothed element, means for converting the rotary motion of the toothed element into rectilinear motion, and a plurality of distance pieces or gauges cooperating with the last-named means to secure adjustment of the toothed element to predetermined angular positions.

13. A device for testing the accuracy of helically-toothed members comprising a support for a helically-toothed member, a distance gauge for cooperation with the teeth of the helically-toothed member and adjustable to predetermined positions in axial planes of the member, a lever having a clamp for cooperation with the helically-toothed member for turning the latter, an adjusting device secured to the other end of the lever, second gauge mechanism, a wheel or drum carried by the helically-toothed member, and a flexible member extending tangentially from the wheel or drum for connection to the second gauge mechanism.

14. A device for testing the accuracy of helically-toothed elements comprising a support for a helically-toothed element, gauge mechanism for cooperation with the teeth of the helically toothed element and movable to predetermined positions in axial planes thereof, second mechanism for determining angular positions of the helically-toothed member, a drum or wheel carried by the helically-toothed member, a tape extending from the wheel or drum and means for connecting the tape to the second-gauge mechanism when the first-gauge mechanism occupies a given position with respect to the helically-toothed member.

15. A device for testing the accuracy of helically-toothed elements comprising a support for a helically-toothed element, an arbor movable in a path parallel to the axis of the helically-toothed element, a tooth feeler pivotally connected to the arbor, an indicator associated with the feeler, an abutment, a series of gauge or distance pieces of predetermined lengths for interposition between the abutment and the arbor, means for turning the arbor, a second arbor disposed transversely of the helically-toothed member, a lever pivotally connected to the second arbor, an indicator associated with one end of the lever, a drum or wheel secured to the toothed element, a flexible member wound about the drum wheel and extending tangentially therefrom, means for connecting the other end of the lever to the flexible member, a second abutment, and a plurality of gauge or distance pieces of predetermined lengths for interposition between the second abutment and the second arbor.

16. A device for testing the accuracy of helically-toothed elements comprising a support for a helically-toothed element, an arbor movable in a path parallel to the axis of the helically-toothed element, a tooth feeler pivotally connected to the arbor, an indicator associated with the feeler, an abutment, a series of gauge or distance pieces of predetermined lengths for interposition between the abutment and the arbor, means for turning the helically-toothed member, a second arbor disposed transversely of the helically-toothed member, a lever pivotally connected to the second arbor, an indicator associated with one end of the lever, a drum or wheel secured to the toothed element, a flexible member wound about the drum or wheel and extending tangentially therefrom, means for connecting the other end of the lever to the flexible member, a second abutment located between the toothed element and the second arbor, and a plurality of distance pieces of predetermined lengths for interposition between the abutment and the second arbor.

17. A device for testing the accuracy of helically-toothed elements comprising a support for a helically-toothed element, gauge mechanism for measuring the teeth in axial planes and including a plurality of distance pieces which differ in length by increments corresponding to the longitudinal pitch of the toothed element, a second gauge mechanism including a plurality of distance pieces which differ in length by increments in accordance with the circular pitch of the toothed element, means for converting rotary motion of the toothed element into rectilinear motion, including a linearly-extending member, means for turning the tooth member in order to secure an initial position thereof, and adjustable means for connecting the linearly-extending member to the second gauge mechanism, whereby the latter gauge mechanism may be brought into co-ordination with the first gauge mechanism for measuring the longitudinal and circular pitch of the teeth.

18. A device for testing the accuracy of helically-toothed elements comprising a support for a helically-toothed element, an arbor arranged parallel to the axis of the helically-toothed element, a tooth feeler carried by the arbor and movable with respect thereto, a measuring device associated with the tooth feeler, a plurality of distance pieces or gauges for cooperation with the arbor, a second arbor, a lever pivotally connected to the second arbor, a measuring device associated with one end of the lever, a drum or wheel carried by the helically-toothed member, a tape extending tangentially from the drum or wheel, an abutment for cooperation with the other end of the lever, means for clamping the abutment to the tape, and means for maintaining the tape taut.

19. A device for testing the accuracy of helically-toothed elements comprising a support for a helically-toothed element, an arbor arranged parallel to the axis of the helically-toothed element, a tooth feeler carried by the arbor and movable with respect thereto, a measuring device associated with the tooth feeler, a plurality of distance pieces or gauges for cooperation with the arbor, a second arbor, a lever pivotally connected to the second arbor, a measuring device associated with one end of the lever, a drum or wheel carried by the helically-toothed member, a tape extending tangentially from the drum or wheel, an abutment for cooperation with the other end of the lever, means for clamping the abutment to the tape, and means for maintaining the wheel or drum in equilibrium.

20. A device for testing the accuracy of helically-toothed elements comprising a support for a helically-toothed element, an arbor arranged parallel to the axis of the helically-toothed element, a tooth feeler carried by the arbor and movable with respect thereto, a measuring device associated with the tooth feeler, a plurality of distance pieces or gauges for cooperation with the arbor, a second arbor, a lever pivotally connected to the second arbor, a measuring device associated with one end of the lever, a drum or wheel carried by the helically-toothed member, a tape extending tangentially from the drum or wheel, an abutment cooperating with the other end of the lever, means for clamping the abutment to the tape, means for maintaining the tape taut, and means for maintaining the wheel or drum in equilibrium.

In testimony whereof we have hereunto subscribed our names this fifteenth day of April, 1921.

HOLBERRY MENSFORTH.
FREDERICK ARTHUR COWELL.